(12) United States Patent
Sun

(10) Patent No.: US 8,880,931 B2
(45) Date of Patent: Nov. 4, 2014

(54) METHOD, DISTRIBUTED SYSTEM AND COMPUTER PROGRAM FOR FAILURE RECOVERY

(75) Inventor: Wei Sun, Tokyo (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 13/520,514

(22) PCT Filed: Dec. 24, 2010

(86) PCT No.: PCT/JP2010/007523
§ 371 (c)(1),
(2), (4) Date: Jul. 3, 2012

(87) PCT Pub. No.: WO2011/080910
PCT Pub. Date: Jul. 7, 2011

(65) Prior Publication Data
US 2012/0303998 A1 Nov. 29, 2012

(30) Foreign Application Priority Data
Jan. 4, 2010 (JP) .................................. 2010-000268

(51) Int. Cl.
*G06F 11/00* (2006.01)
*G06F 11/20* (2006.01)
*G06F 11/14* (2006.01)

(52) U.S. Cl.
CPC ........ *G06F 11/2041* (2013.01); *G06F 11/2046* (2013.01); *G06F 11/2028* (2013.01); *G06F 11/2025* (2013.01); *G06F 11/1438* (2013.01); *G06F 11/2097* (2013.01)
USPC .............................................. 714/4.1; 714/15

(58) Field of Classification Search
CPC ................................................. G06F 11/1407
USPC ........................................ 714/4.11, 6.23, 15
See application file for complete search history.

(56) References Cited

U.S. PATENT DOCUMENTS

| 7,389,300 B1 | 6/2008 | Shah et al. |
| 7,478,275 B1 * | 1/2009 | Deolasee et al. ................. 714/13 |

(Continued)

FOREIGN PATENT DOCUMENTS

| JP | 08-314875 A | 11/1996 |
| JP | 10-275133 A | 10/1998 |

(Continued)

OTHER PUBLICATIONS

D. S. Milojicic et al., "Process Migration", ACM Computing Surveys, Association for Computing Machinery, Sep. 2000, pp. 241-299, vol. 32, No. 3, (U.S.A.).

(Continued)

*Primary Examiner* — Yolanda L Wilson
(74) *Attorney, Agent, or Firm* — Sughrue Mion, PLLC

(57) ABSTRACT

A distributed system includes: nodes each having a memory, running distributed processes, and checkpointing to create checkpoint data for each process; a selection unit selecting spare nodes for future failure recovery for each process; an allocation unit allocating and transmitting the checkpoint data to the spare nodes to make the spare nodes store the checkpoint data before failure; and a recovery unit selecting one checkpoint data for recovery, activates the selected checkpoint data to run a process on the spare node, or partitions the existing stored checkpoint data, when any checkpoint data is not suitable for recovery, the partitions of the checkpoint data as a whole being integrated into a complete checkpoint data; and transmitting the partitions from the spare nodes to a new node, and reorganizing the partitions into complete data to be activated to run a process on the new node.

15 Claims, 9 Drawing Sheets

(56) References Cited

U.S. PATENT DOCUMENTS

| | | | |
|---|---|---|---|
| 8,639,968 B2* | 1/2014 | Yoon et al. | 714/6.1 |
| 2002/0091718 A1* | 7/2002 | Bohannon et al. | 707/202 |
| 2007/0214394 A1 | 9/2007 | Gross et al. | |
| 2009/0138757 A1 | 5/2009 | Matsumoto et al. | |
| 2011/0196950 A1* | 8/2011 | Underwood et al. | 709/223 |

FOREIGN PATENT DOCUMENTS

| | | |
|---|---|---|
| JP | 2009-129409 A | 6/2009 |
| WO | 2006/075332 A2 | 7/2006 |

OTHER PUBLICATIONS

E. N. (Mootaz) Elnozahy et al., "A Survey of Rollback-Recovery Protocols in Message-Passing Systems", ACM Computing Surveys (CSUR), Association for Computing Machinery, Sep. 2002, pp. 375-408, vol. 34, No. 3, , (U.S.A.).

H. Nakamura et al., "Skewed Checkpointing for Tolerating Multi-Node Failures", Proceedings of the 23rd IEEE (Institute of Electrical and Electronics Engineers, Inc.), International Symposium on Reliable Distributed Systems (SRDS'04), IEEE Computer Society, 2004, pp. 116-125, (U.S.A.).

M. Kondo et al., "Evaluation of Checkpointing Mechanism on SCore Cluster System", IEICE (Institute of Electronics, Information and Communication Engineers) Transactions on Information and Systems E series D, Institute of Electronics, Information and Communication Engineers, Jan. 2003, pp. 2553-2562, vol. E86-D, No. 1, (Great Britain).

J. S. Plank et al., "Faster Checkpointing with N+1 Parity", Proceedings of the 24th International Symposium, Fault-Tolerant Computing, University of Tennessee, 1994, pp. 288-297, (U.S.A.).

J. S. Plank et al. "Diskless Checkpointing", IEEE Transactions on Parallel and Distributed Systems, IEEE Press, Oct. 1998, pp. 972-986, vol. 9, No. 10, (U.S.A.).

W. Gao et al., "A Faster Checkpointing and Recovery Algorithm with a Hierarchical Storage Approach", Proceedings of the Eighth International Conference on High-Performance Computing in Asia-Pacific Region (HPCASIA'05), IEEE Computer Society, 2005, p. 398-402, (U.S.A.).

S. Agarwal et al., "Adaptive Incremental Checkpointing for Massively Parallel Systems", Proceedings of the 18th Annual International Conference on Supercomputing (ICS), Association for Computing Machinery, 2004, pp. 277-286, (U.S.A.).

E. N. Elnozahy, "How Safe is Probabilistic Checkpointing?" Proceedings of the 28th Annual International Symposium on Fault-Tolerant Computing (FTCS), IEEE Computer Society, 1998, pp. 358-363, (U.S.A.).

International Search Report of PCT/JP2010/007523 dated Jul. 8, 2011.

Communication dated Sep. 2, 2014, issued by the Japanese Patent Office in corresponding Application No. 2012-530029.

* cited by examiner

METHOD, DISTRIBUTED SYSTEM AND COMPUTER PROGRAM FOR FAILURE RECOVERY

CROSS REFERENCE TO RELATED APPLICATIONS

This application is a National Stage of International Application No. PCT/JP2010/007523 filed Dec. 24, 2010, claiming priority based on Japanese Patent Application No. 2010-000268 filed Jan. 4, 2010, the contents of all of which are incorporated herein by reference in their entirety.

TECHNICAL FIELD

The present invention relates to a method, a distributed system, and a computer program for failure recovery, more particularly, to a method, a distributed system, and a computer program in which checkpointing and recovery of processes are performed.

BACKGROUND ART

To tolerate the faults in distributed systems, one of often used art is to move the failed process/job (hereinafter simply say process denoting program, task, job and any running unit, which can perform checkpointing) to another healthy machine/node (hereinafter only node simply). Process migration can move a running process from a node to another node (Non-Patent Literature NPL 1). To move processes simply by migration cannot tolerate failures of hardware because the processes in the failed hardware cannot be retrieved. Hence, process migration takes limited effect on fault tolerance and a similar technique, checkpointing/recovery, emerges (Non-Patent Literature NPL 2).

The existing checkpointing/recovery techniques in distributed systems can be classified roughly into two classes, disk-based and diskless. The mechanism of disk-based checkpointing/recovery has been surveyed in NPL 2. In distributed and parallel computer systems such as clusters, the disk-based checkpointing/recovery is implemented in the distributed way such as that of Non-Patent Literatures NPL 3 and NPL 4. In order to eliminate the delay from disk access, diskless checkpointing was developed and firstly presented in Non-Patent Literature NPL 5 and it became matured in Non-Patent Literature NPL 6. An example of using diskless checkpointing/recovery in cluster systems is described in Non-Patent Literature NPL 7.

Incremental (described in Non-Patent Literature NPL 8) and probabilistic (described in Non-Patent Literature NPL 9) checkpointing can effectively reduce the checkpointing time and the data transmission cost. Finally, multicast is also involved in this invention, but the multicast in this invention is much simpler than that in group communication because the source and the destination of the communication are typical master/slave relation.

No matter what kind of checkpointing/recovery techniques existing in the distributed systems currently, the checkpoint data of a process must be transferred to a newly selected node which is healthy to run the process continually. Two examples are shown here to explain the data transfer. In Non-Patent Literatures NPL 3 and NFL 4, the whole checkpoint data is stored separately in distributed nodes with the parity computed from the data fractions in the neighboring nodes. Thus, in each node are the fractions of the data and the parity of the data fraction stored. When a permanent failure happens in a node, the data fraction will be transferred to its neighbor node recursively and in the neighbor node the data fraction and the parity will be used to calculate the original data fraction in the neighbor node.

Although the nodes operate the checkpointing/recovery in parallel, the parity calculation of each data fraction must be performed sequentially. Therefore, the recovery time is equal to the transmission time of the whole checkpoint data of a process and the calculation time of parities. Here, the time of rebuilding the program running context in memory is ignored since no disk operation is involved and this rebuilding time is usually very short.

In Non-Patent Literature NPL 6, the time delay from the data transmission and the parity computation is the same as that of Non-Patent Literatures NPL 3 and NPL 4, the difference is merely the system of Non-Patent Literature NPL 6 is diskless. In Non-Patent Literature NPL 7, the data of each process is stored in local memory and the parity is calculated from all the data. If a failure happens in a node, the remaining data and the parity will be transferred into a newly selected node.

In Patent Literature PTL 1 (Japanese Laid-open patent publication NO. 2009-129409), it is assumed that all computers are classified into business computers and idle computers. The business computers run the programs and the idle computers only store the data for recovery. It is mentioned in Patent Literature PTL 1 (Japanese Laid-open patent publication NO. 2009-129409) that the checkpoint file of a process can be stored in a computer by unicast or all the computers by multicast. But there is no information for when to use multicast and how many other computers are needed in Patent Literature PTL 1 (Japanese Laid-open patent publication NO. 2009-129409). In Patent Literature PTL 1 (Japanese Laid-open patent publication No. 2009-129409) the checkpoint can only be stored in specific computers and the checkpoint data cannot be cut into pieces and re-integrated in a newly selected computer. The recovery cost is not significantly reduced.

Patent Literature PTL 2 (Japanese Laid-open patent publication No. H10-275133) introduces how the checkpoint and recovery information are collected, stored, handled and reported. There is only one copy of the checkpoint data and the recovery is a deterministic method. The recovery cost is also not significantly reduced.

In Patent Literature PTL 3 (Japanese Laid-open patent publication No. H08-314875), a method for shared memory distributed systems is shown. The method proposed in this patent is different from the above methods because this method only guarantees that the average checkpoint/recovery cost is significantly reduced and the checkpoint data in this invention can be cut into pieces and re-integrated. In other words, this is a randomized method.

The recovery time is at least the transmission time of the data of a process plus the computation time of the parity. Despite that the computation time of parity is argued to be short, the computation time is really too long in wireless and mobile distributed computing, where the data transfer speed is slow and the computing power is weaker than usually desktop.

The recovery time is much longer if the network bandwidth and latency are deteriorated, such as in the large scale distributed systems, Grids, Clouds and P2P (Peer to Peer) systems and wireless and mobile distributed systems. This problem cannot be solved by the existing techniques, since logically the failure process cannot be recovered without transferring all the checkpoint data to the new node. The additional parity computation postpones the recovery time further. Let $t_D$ denote the disk access time; let $t_N$ denote the data transmission time on network; let $t_P$ denote the parity computation time; the recovery time $t_R$ can be represented as $t_R = t_D + t_N + t_P$. For diskless checkpointing/recovery, $t_R = t_N + t_P$.

CITATION LIST

Patent Literature

[PTL 1] Japanese Laid-open patent publication NO. 2009-129409
[PTL 2] Japanese Laid-open patent publication NO. H10-275133
[PTL 3] Japanese Laid-open patent publication NO. H08-314875

Non Patent Literature

[NPL 1] D. S. Milojicic et al., and four others, "Process Migration", ACM Computing Surveys, (U.S.A.), Association for Computing Machinery, September 2000, Vol. 32, No. 3, pp. 241-299.
[NPL 2] E. N. (Mootaz) Elnozahy et al., and three others, "A Survey of Rollback-Recovery Protocols in Message-Passing Systems", ACM Computing Surveys (CSUR), (U.S.A.), Association for Computing Machinery, September 2002, Vol. 34., No. 3, pp. 375-408.
[NPL 3] H. Nakamura et al., and five others, "Skewed Checkpointing for Tolerating Multi-Node Failures", Proceedings of the 23rd IEEE (Institute of Electrical and Electronics Engineers, Inc.) International Symposium on Reliable Distributed Systems (SRDS'04), (U.S.A.), 2004, IEEE Computer Society, pp. 116-125.
[NPL 4] M. Kondo et al., and five others, "Evaluation of Checkpointing Mechanism on SCore Cluster System", IEICE (Institute of Electronics, Information and Communication Engineers) Transactions on Information and Systems E series D, (Great Britain), Institute of Electronics, Information and Communication Engineers, January 2003, Vol. E86-D, No. 1, pp. 2553-2562.
[NPL 5] J. S. Plank et al, and one other, "Faster Checkpointing with N+1 Parity", Proceedings of the 24th International Symposium, Fault-Tolerant Computing, (U.S.A.), University of Tennessee, 1994, pp. 283-297.
[NPL 6] J. S. Plank et al., and two others, "Diskless Checkpointing", IEEE Transactions on Parallel and Distributed Systems, (U.S.A.), IEEE Press, October 1998, Vol. 9, No. 10, pp. 972-986.
[NPL 7] W. Gao et al., and two others, "A Faster Checkpointing and Recovery Algorithm with a Hierarchical Storage Approach", Proceedings of the Eighth International Conference on High-Performance Computing in Asia-Pacific Region (HPCASIA'05), (U.S.A.), IEEE Computer Society, 2005, p. 398.
[NPL 8] S. Agarwal et al., and three others, "Adaptive Incremental Checkpointing for Massively Parallel Systems", Proceedings of the 18th annual International Conference on Supercomputing (ICS), (U.S.A.), Association for Computing Machinery, 2004, pp. 277-286.
[NPL 9] E. N. Elnozahy, "How Safe Is Probabilistic Checkpointing?", Proceedings of the 28th Annual International Symposium on Fault-Tolerant Computing (FTCS), (U.S.A.), IEEE Computer Society, 1998, pp.358-363.

SUMMARY OF INVENTION

An exemplary object of the invention is to provide a method, a system, and a computer program for failure recovery that can improve a network transmission delay and disk read or write delay when checkpointing or recovery is used in a large scale distributed system.

In one exemplary embodiment, there is provided a method for failure recovery in a system including a plurality of nodes connected with each other through a network, each having a memory, and the nodes running distributed processes, including: performing checkpointing on the processes to create checkpoint data for each process to be stored in the memory of the each node; selecting spare nodes for future failure recovery for the each process before the failure occurs in the each process; previously allocating the checkpoint data to the selected spare nodes and to be transmitted to the selected spare nodes from the each node which runs the each process to make the selected spare nodes store the transmitted checkpoint data in the memories, respectively, before the failure occurs in the each process; judging whether at least one checkpoint data is suitable for recovering the detected failure process stored in the memories of the spare nodes when the failure occurs in said processes; selecting one checkpoint data for recovering the failure process when the judgment is made that at least one checkpoint data is suitable for recovery, to activate the selected checkpoint data to run a process on at least one of the spare nodes, so that the failure process can be recovered; partitioning the existing checkpoint data stored in the memory of each spare node for the failure process into partitions, when the judgment is made that any one checkpoint data is not suitable for recovery, the partitions of the checkpoint data of respective spare nodes as a whole being integrated into complete checkpoint data for the failure process; and transmitting the partitions of checkpoint data respectively from the spare nodes for the failure process to a new node newly selected for recovery through the network, and to reorganize the transmitted partitions of the checkpoint data into the complete checkpoint data for the failure process to be activated to run a process on the new node, so that the failure process can be recovered.

In another exemplary embodiment, there is provided a distributed system including: a plurality of nodes connected with each other through a network, each having a memory, and the nodes running distributed processes; a checkpointing unit which performs checkpointing on the processes to create checkpoint data for each process to be stored in the memory of the each node; a node selection unit which selects spare nodes for future failure recovery for the each process before the failure occurs in the each process; an allocation unit which allocates the checkpoint data to the selected spare nodes and to be transmitted to the selected spare nodes from the each node which runs the each process to make the selected spare nodes store the transmitted checkpoint data the memories, respectively, before the failure occurs in the each process; a judgment unit which judges whether at least one checkpoint data is suitable for recovering the failure process stored in the memories of the spare nodes when the failure occurs in said processes; a checkpoint selection unit which selects one checkpoint, data for recovering the failure process when the judgment is made that at least one checkpoint data is suitable for recovery, to activate the selected checkpoint data to run a process on at least one of the spare nodes, so that the failure process can be recovered; a checkpoint partition unit which partitions the existing checkpoint data stored in the memory of each spare node for the failure process into partitions, when the judgment is made that any one checkpoint data is not suitable for recovery, the partitions of the checkpoint data of respective spare nodes as a whole being integrated into complete checkpoint data for the failure process; and a reorganization unit which transmits the partitions of checkpoint data respectively from the spare nodes for the failure process to a new node newly selected for recovery through the network, and to reorganize the transmitted partitions of the checkpoint data into the complete checkpoint data for the failure process to be activated to run a process on the new node, so that the failure process can be recovered.

In another embodiment, there is provided a management apparatus for failure recovery in a distributed system, the distributed system including a plurality of nodes connected with each other through a network, each of the node having a memory, and the nodes running distributed process and performing checkpointing on the processes to create checkpoint data for each process, including: a node selection unit which selects spare nodes for future failure recovery for the each process before the failure occurs in the each process; a pre-allocation unit which previously allocates the checkpoint data to the selected spare nodes and to be transmitted to the selected spare nodes from each node which runs the each process to make the selected spare nodes store the transmitted checkpoint data in its memory before the failure occurs in the each process; a detection unit which detects a failure process in which failure has occurred; a judgment unit which judges whether at least one checkpoint data is suitable for recovering the detected failure process on the spare nodes when the failure process is detected; a checkpoint selection unit which selects one checkpoint data for recovery the failure process when the judgment is made that at least one checkpoint data is suitable for recovery, to have at least one of the spare node activate the selected checkpoint data to run a process, so that the failure process can be recovered; a recovery unit which has each of the spare nodes for the failure process partition the existing checkpoint data in its memory into partitions, so as to integrate the partitions of the checkpoint data of respective spare nodes as a whole into complete checkpoint data for the failure process; and a reorganization unit which has respective spare nodes for the failure process transmit the partitions of checkpoint data respectively to a new node newly selected for recovery through the network when the judgment is made that any one checkpoint data is not suitable for recovery, and to have the new node reorganize the transmitted partitions of the checkpoint data into the complete checkpoint data for the failure process to be activated to run a process, so that the failure process can be recovered.

In another embodiment, there is provided computer program recorded in a record medium capable of being executed by a computer to perform a management apparatus, a plurality of the nodes in a distributed system connected with each other through a network, each of the node having a memory, and the nodes running distributed process and performing checkpointing on the processes to create checkpoint data for each process, wherein the computer executes the procedures of: selecting spare nodes for future failure recovery for the each process before the failure occurs in the each process; instructing the nodes to previously allocate the checkpoint data to the selected spare nodes and to be transmitted to the selected spare nodes from each node which runs the each process to make the selected spare nodes store the transmitted checkpoint data in its memory before the failure occurs in the each process; judging whether at least one checkpoint data is suitable for recovering the detected failure process on the spare nodes when the failure occurs in said processes; selecting one checkpoint data for recovery the failure process when the judgment is made that at least one checkpoint data is suitable for recovery, to have at least one of the spare node activate the selected checkpoint data to run a process, so that the failure process can be recovered; instructing each of the spare nodes for the failure process to partition the existing checkpoint data in its memory into partitions, so as to integrate the partitions of the checkpoint data of respective spare nodes as a whole into complete checkpoint data for the failure process; instructing respective spare nodes for the failure process to transmit the partitions of checkpoint data respectively to a new node newly selected for recovery through the network when the judgment is made that any one checkpoint data is not suitable for recovery; and instructing the new node to reorganize the transmitted partitions of the checkpoint data into the complete checkpoint data for the failure process to be activated to run a process, so that the failure process can be recovered.

In another embodiment, there is provided a node in a distributed system, a plurality of the nodes being connected with each other through a network, and connected to a management apparatus for controlling the nodes through the network, including: a processing unit which executes distributed processes to run in accordance with the control of the management apparatus; a checkpointing unit which performs checkpointing on the processes to create checkpoint data for each process; a memory which stores the checkpoint data; and a multicasting unit which multicasting the checking data to spare nodes for future failure recovery of the running process specified from the management apparatus and to have the specified spare nodes stored the received checkpoint data in the memories, respectively.

In another embodiment, there is provided a node in a distributed system, a plurality of the nodes being connected with each other through a network, connected to a management apparatus for controlling the nodes through the network, and serving as a spare for running nodes, including: a processing unit which can execute distributed processes to run in accordance with the control of the management apparatus; a receiving unit which receives checkpointing data transmitted from other nodes which run the processes through the network; a memory which stores the received checkpoint data; a processing unit which executes distributed processes to run in accordance with the control of the management apparatus; an activate unit which in accordance with the control of the management apparatus when a process occurs a failure and the management apparatus judges that the checkpoint data stored in the memory is suitable for recovering the failure, activates the checkpoint data stored in the memory to have the processing unit run a process, so that a failure process can be recovered; a checkpoint partition unit which partitions the existing checkpoint data stored in the memory for a failure process into partitions, in accordance with the control of the management apparatus when a process occurs a failure and the management apparatus judges that any one checkpoint data is not suitable for recovering the failure, the partitions of the checkpoint data of respective spare nodes as a whole being integrated into complete checkpoint data for the failure process; and a transmitting unit which transmits one of the partitions of checkpoint data to a new node newly selected for recovery through the network in accordance with the control of the management apparatus.

In another embodiment, there is provided a node in a distributed system, a plurality of said nodes being connected with each other through a network, and connected to a management apparatus for controlling said nodes through said network, including: a processing unit which executes distributed processes to run in accordance with the control of said management apparatus; a receiving unit which receives partitions of checkpoint data from respective spare nodes which are previously prepared for future failure recovery and reserve the checkpointing data for recovering processes, said partitions of said checking data as a whole being integrated into complete checkpoint data for failure process; and a reorganization unit which reorganizes the received partitions of said checkpoint data into said complete checkpoint data for said failure process to be activated to have said processing unit run a process in accordance with the control of said management apparatus when a process occurs a failure, so that said failure process can be recovered.

Here, any combination of the above-described constituent elements as well as conversion of the expression of the present invention among methods, apparatuses, systems, recording media, computer programs, and others is also effective as a mode of the present invention.

Also, various constituent elements of the present invention need not necessarily be individually independent, and there may be a case in which a plurality of constituent elements are formed into one member, a case in which one constituent element is formed with a plurality of members, a case in which one constituent element is a part of another constituent element, a case in which the a part of one constituent element and a part of another constituent element overlap with each other, and the like cases.

Though the method and the computer program of the present invention recite a plurality of procedures in order, the order of description does not limit the order of execution of the plurality of procedures. For this reason, in executing the method and the computer program of the present invention, the order of the plurality of procedures can be changed within a range that does not deteriorate the scope of the present invention.

Also, the plurality of procedures of the method and the computer program of the present invention are not limited to being executed at timings that are individually different from each other. For this reason, there may be a case in which another procedure is performed while a certain procedure is being executed, a case in which an execution timing of a certain procedure and an execution timing of another procedure are partly or wholly overlapped with each other, and the like cases.

BRIEF DESCRIPTION OF DRAWINGS

The above and other objects, advantages, and features of the present invention will be more apparent from the following description of certain preferred exemplary embodiments taken in conjunction with the accompanying drawings, in which.

DESCRIPTION OF EMBODIMENTS

Figure 1:
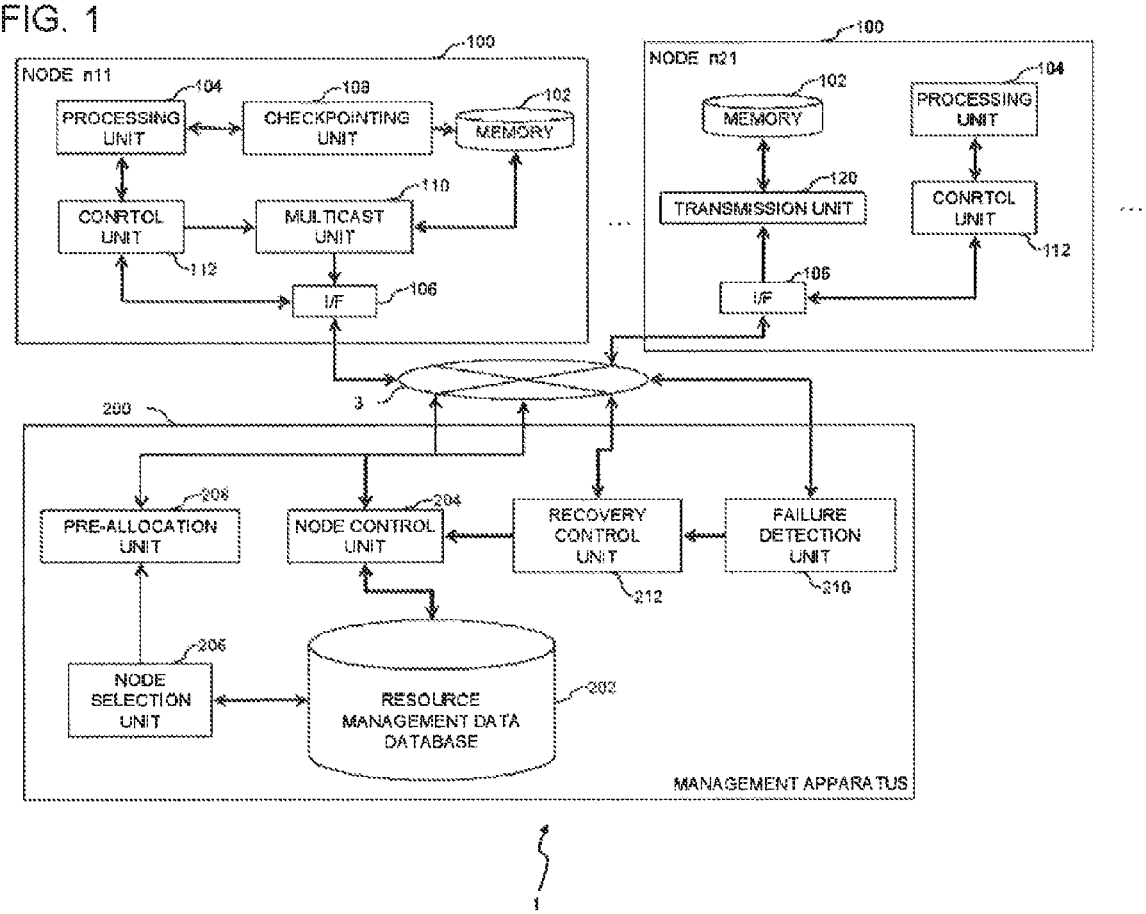
FIG. 1 is a functional block diagram illustrating a construction of a distributed system according to an exemplary embodiment of the present invention.

The invention will now be described herein with reference to illustrative exemplary embodiments. Those skilled in the art will recognize that many alternative exemplary embodiments can be accomplished using the teachings of the present invention and that the invention is not limited to the exemplary embodiments illustrated for explanatory purposes.

Here, in all of the drawings, similar constituent elements will be denoted with like reference numerals, and the description thereof will not be repeated.

Referring to FIGS. 1 to 9 of the drawings, an exemplary embodiment of a distributed system according to the present invention will be described hereinafter.

FIG. 1 is a functional block diagram illustrating a construction of the distributed system according to the exemplary embodiment of the present invention.

Here, some definitions are added to facilitate the below descriptions. In this exemplary embodiment, there are m processes running in n nodes. The number of pre-selected nodes for each process is represented by $k_i$, which must be less than n. Here, i indicates the number of the running processes, and i=1, 2, ..., m. The set of suitable nodes to be pre-selected is $K_i$, which certainly is greater or equal to $k_i$. If one of the pre-selected nodes is suitable for recovery, then it is said "hit". If no pre-selected node is suitable for recovery, then it is said "miss". The hit probability is denoted to be $P_h$. The mechanism certainly is twofold, checkpointing and recovery.

In FIG. 1, the distributed system according to the exemplary embodiment of the present invention includes a plurality of nodes 100, and a management apparatus 200 connected with each other through a network 3.

The management apparatus 200 and the nodes 100 are computers. The management apparatus 200 and the nodes 100 realize various functions for the management apparatus 200 and the nodes 100 by executing corresponding computer program that is mounted on a memory (not illustrated in the drawings). Here, in the drawings, the construction of the parts that will not be essentially related to the gist of the present invention and not be illustrated in the drawings.

Also, each of the constituent elements of the distributed system 1 is realized by an arbitrary combination of hardware and software including, at the center thereof, a CPU (Central Processing Unit) of an arbitrary computer, a memory, a program that realizes the constituent elements of the present drawings and that is loaded on the memory, a storage unit such as a hard disk that stores the program, and an interface for connection to the network. Then, those skilled in the art will understand that there may be various modifications to the method of realization thereof, and the apparatus. Each of the drawings described in the following shows a block of a functional unit rather than the construction of a hardware unit.

The distributed system 1 according to the exemplary embodiment of the present invention includes software for supporting fault tolerance in large scale distributed systems. Specially, in the exemplary embodiment, the systems includes such as Grid, P2P, Cloud computing systems and wireless and mobile computing systems, and so on.

Figure 2:
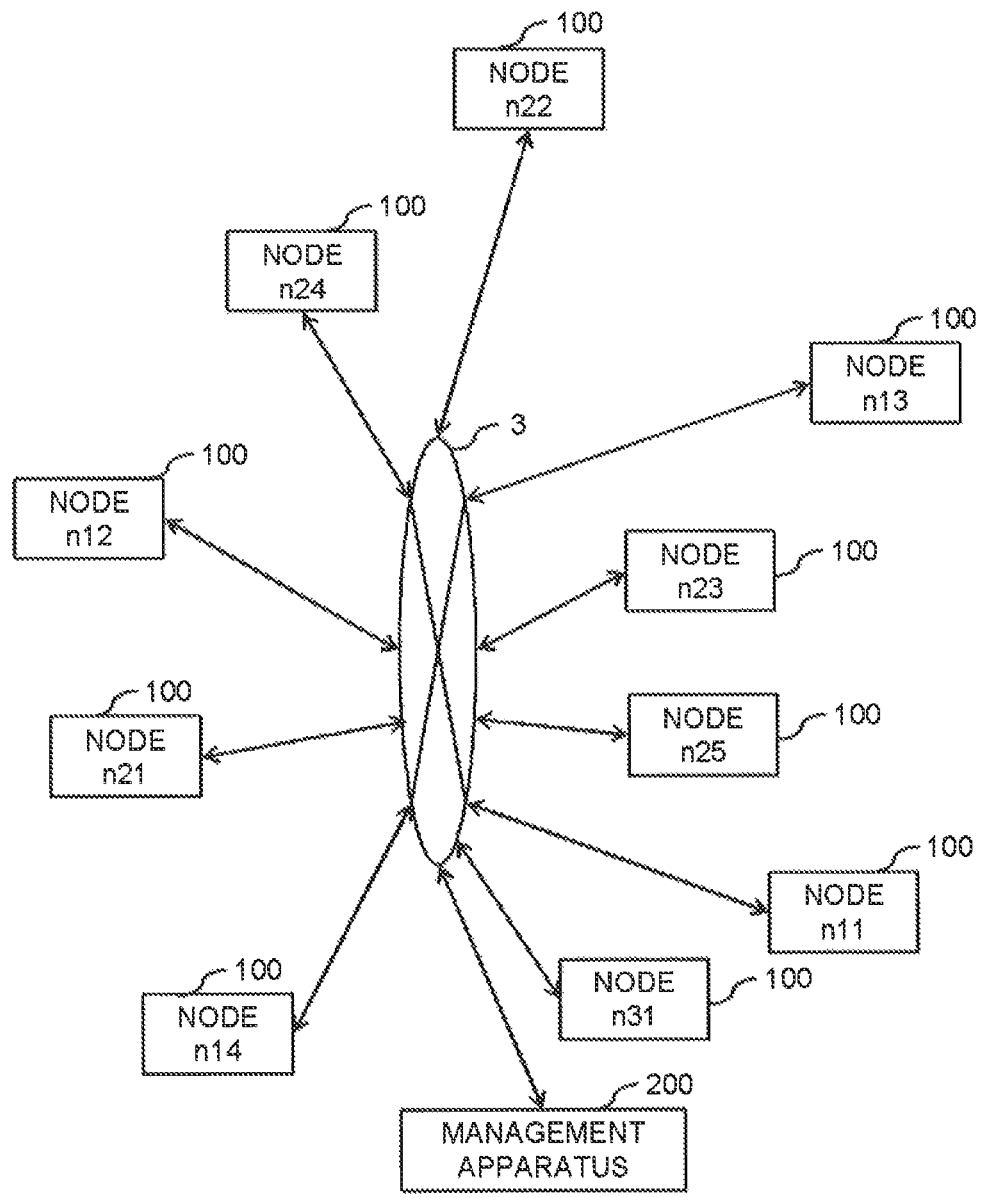
FIG. 2 is a block diagram showing a network construction of the distributed system shown in FIG. 1.

FIG. 2 is a block diagram showing a network construction of the distributed system 1 shown in FIG. 1.

As shown in FIG. 2, the distributed system 1 includes a plurality of nodes 100 having a first node referred to as "n11", "n12", and "n13", and a second node referred to as "n21", "n22", and "n23", . . . , and a third node referred to as "n31", . . . . The number of nodes is not limited to this construction shown in FIG. 2. This illustrates only an example of the construction.

In this exemplary embodiment, the first nodes n11, n12, . . . run the processes in accordance with the control of the management apparatus 200. The processes are monitored by the management apparatus 200, thereby detecting failure.

The second nodes n21, n22, . . . are selected by the management apparatus 200, and serve spare nodes for future failure recovery before a failure occurs in the process. A plurality of spare nodes n21, n22, . . . are provided for each process which runs nodes 100. The management apparatus 200 selects spare nodes n21, n22, . . . for future failure discovery. This operation will be described in detailed thereafter.

The third node n31 is selected by the management apparatus 200 for recovery when there is no checkpoint data suitable for the failure process. The selection of the third node n31 will be explained thereafter.

Returning to FIG. 1 of the drawings, the first node n11 has a memory 102, a processing unit 104, an interface unit (I/F) 106, a checkpointing unit 108, a multicast unit 110, and a control unit 112. The second node n12 has a transmission unit 120 in addition to the same constitutional elements of the first node n11. The management apparatus 200 includes a resource management data database 202, a node control unit 204, a node selection unit 206, a pre-allocation unit 208, a failure detection unit 210, a recovery control unit 212, and an interface unit, not shown in the drawings, for serving an interface for a network 3.

Figure 3:
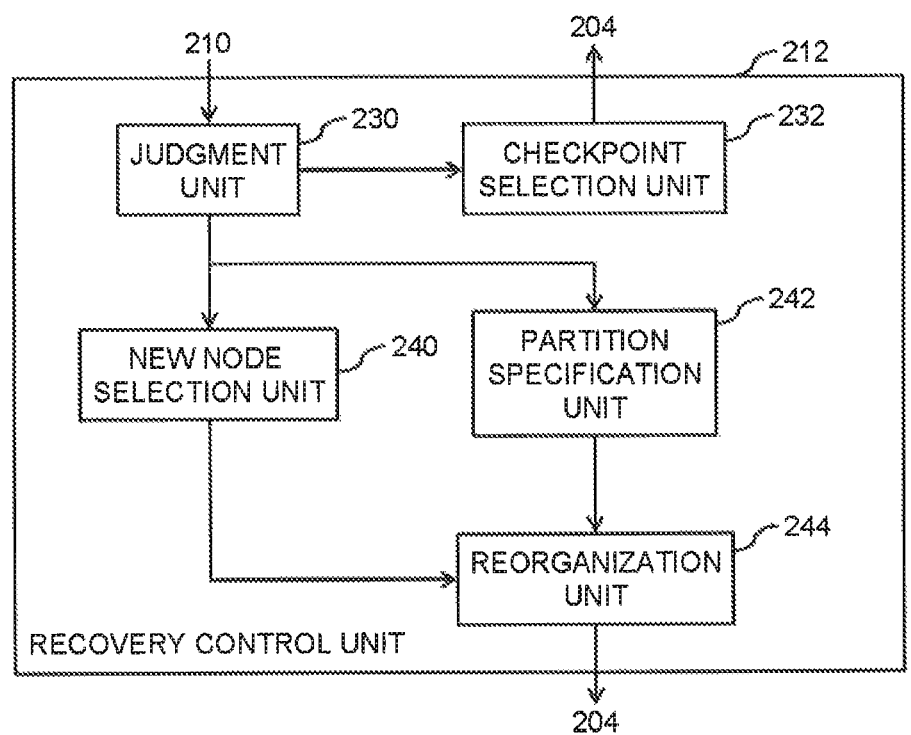
FIG. 3 is a block diagram showing a construction of the recovery control unit of the management apparatus in the distributed system shown in FIG. 1.

FIG. 3 shows a block diagram of the recovery control unit 212 shown in FIG. 1 in detailed.

As shown in FIG. 3, the recovery control unit 212 includes a judgment unit 230, a checkpoint selection unit 232, a new node selection unit 240, a partition specification unit 242, and a reorganization unit 244.

As shown in FIG. 1, the distributed system 1 according to the exemplary embodiment of the present invention includes: a plurality of nodes 100 connected with each other through a network 3, each having a memory 102, and the nodes 100 (referred to as "n11" in FIG. 1) running distributed processes; a checkpointing unit 108 which performs checkpointing on the processes to create checkpoint data for each process to be stored in the memory 162 of the each node 100; a node selection unit 206 which selects spare nodes 100 (referred to as "n21" in FIG. 1) for future failure recovery for the each process before the failure occurs in each process; a pre-allocation unit 208 which previously allocates the checkpoint data to the selected spare nodes 100 and to be transmitted to the selected spare nodes 100 from the each node 100 which runs the each process to make the selected spare nodes 100 store the transmitted checkpoint data in the memories 102, respectively, before the failure occurs in each process; a judgment unit 230 (recovery control unit 212) which judges whether at least one checkpoint data is suitable for recovering the failure process stored in the memories 102 of the spare nodes 100 when the failure occurs in the processes; a checkpoint selection unit 232 (recovery control unit 212) which selects one checkpoint data for recovering the failure process when the judgment is made that at least one checkpoint data is suitable for recovery, to activate the selected checkpoint data to run a process on at least one of the spare nodes 100, so that the failure process can be recovered; a checkpoint partition unit (partition specification unit 242, recovery control unit 212) which partitions the existing checkpoint data stored in the memory 102 of each spare node for the failure process into partitions, when the judgment is made that any one checkpoint data is not suitable for recovery, the partitions of the checkpoint data of respective spare nodes 100 as a whole being integrated into complete checkpoint data for the failure process; and a reorganization unit 244 (new node selection unit 240 recovery control unit 212) which transmits the partitions of checkpoint data respectively from the spare nodes 100 for the failure process to a new node (no shown in FIG. 1) newly selected for recovery through the network 3, and to reorganize the transmitted partitions of the checkpoint data into the complete checkpoint data for the failure process to be activated to run a process on the new node, so that the failure process can be recovered.

As shown in FIG. 1, in the first node n11, the memory 102 stores a checkpoint data. The processing unit 104 runs distributed processes in accordance with the control of the management apparatus 200. The processing unit 104 uses a memory (not shown) stored in a program or data. This is not essential to the present invention, therefore the detailed description is not explained in this specification.

The interface unit 106 serves an interface for a network. The node 100 can communicate with the other nodes 100, the management apparatus 200, and the other devices, not shown, on the network 3 through the interface unit 106.

The checkpointing unit 108 performs checkpointing on the processes to create checkpoint data for each process which runs on the processing unit 104 and stores the created checkpoint data in the memory 102. In this exemplary embodiment, the checkpointing unit 108 may perform checkpointing including an incremental or probabilistic checkpointing or a combination thereof.

The multicast unit 110 multicast the checkpoint data created by the checkpointing unit 108 to the spare node (the second node n21) through the interface unit 106 via the network 3.

The control unit 112 controls the operation of the node 100 in accordance with the control of the management apparatus 200.

In the second node n21, the transmission unit 120 receives the checkpoint data from the first node n11 through the interface unit 106 and stores the received checkpoint data in the memory 102.

In the management apparatus 200, the resource management data database 202 stores a variety of data on resources, such as the nodes 100. The node control unit 204 controls the nodes 100 to run distributed processes and checkpointing and recovery processes according to the present invention.

The node selection unit 206 selects the spare nodes n21, n22, . . . for further failure recovery for each process before the failure occurs in each process. Here, the number of spare nodes n21, n22, . . . is k. The pre-allocation unit 208 previously allocates the checkpoint data to the selected spare nodes n21 before the failure occurs in said each process to be transmitted to the selected spare nodes n21 from each first node n11 which runs each process through the network 3. The pre-allocation unit 208 then makes the selected spare nodes n21 store the transmitted checkpoint data in the memories 102, respectively. The transmitted checkpoint data can be used for the future failure recovery.

The failure detection unit 210 detects a failure process in which failure has occurred. The failure detection unit 210 may be unnecessary to be included in the management apparatus 200, may only receive information on the failure of the process from another monitoring device on the network 3.

The recovery control unit 212 will be described bellow in detailed with reference to FIG. 3 of the drawings.

The judgment unit 230 judges whether at least one checkpoint data is suitable for recovering the detected failure process stored in the memories 102 of the spare nodes n21 when the failure process is detected by the failure detection unit 210.

The judgment unit 230 may make its decisions on the basis of some criteria, which are listed as follows.
1. CPU Load. If the CPU is heavily loaded, the node is not suitable for recovery. This criterion is usually adopted by computation-intensive application and users.
2. Available Memory. If the available memory is small, the node is not suitable for recovery. This criterion is usually adopted by data-intensive application and uers.
3. Some other criterion can be defined by system users. This is a function left for users.

The checkpoint selection unit 232 selects one checkpoint data for recovering the failure process when the judgment is made by the judgment unit 230 that at least one checkpoint data is suitable for recovery. The checkpoint selection unit 232 then has at least one of the spare node n21 activate the selected checkpoint data to run a process on at least one of the spare nodes n21, so that the failure process can be recovered.

The checkpoint selection unit 232 finds a proper recovery point from the checkpoint data when the judgment is made by the judgment unit 230 that at least one checkpoint data is suitable for recovery. The recovery unit 212 instructs to the node control unit 204 to have the selected spare node 100 then prepare memory context for the failure process, and then activate the recovered process so as to restart a recover process from the recovery point.

The new node selection unit 240 selects a new node for recovery. The selection standards for pre-selecting nodes for checkpointing and newly selecting spare node for recovery are not specified in this invention, because they are up to the system builders and users. If a system has enough computational nodes, each selection will aim at the empty nodes. Otherwise, the selection may aim at the lightest loaded nodes. Certainly, application attributes may also affect the decision of the selections. Hence, no general standard can fit all applications and systems.

The partition specification unit 242 causes each of the spare nodes n21 for the failure process to partition the existing checkpoint data in its memory 102 into 1/k partitions, so as to integrate the 1/k partitions of said checkpoint data of respective spare nodes as a whole into complete checkpoint data for the failure process.

The reorganization unit 244 has respective spare nodes n21 for the failure process transmit the 1/k partitions of checkpoint data respectively to the new node selected by the new node selection unit 240 through the network 3 when the judgment is made by the judgment unit 230 that any one checkpoint data is not suitable for recovery. For example, the situation when any one checkpoint data is not suitable for recovery may be that the in each spare node n2x where the checkpoint data are stored the CPU is heavily loaded or little memory are available. The reorganization unit 244 then has the new node reorganize the transmitted partitions of said checkpoint data into the complete checkpoint data for the failure process to be activated to run a process, so that the failure process can be recovered. The recovery unit 212 then instructs the node control unit 204 to have the new node prepare memory context for the failure process and then activate the recovered process.

The checkpointing and recovery mechanism will be explained in detailed hereinafter.

(Checkpointing)

A process is checkpointed incrementally and the checkpoint data are stored in local memory 102 of the node n11 (FIG. 1) and transferred to the $k_i$ remote memories 102 of the spare nodes n12 (FIG. 1) by multicast simultaneously. The $k_i$ remote nodes n12 are selected according to some criterion, such as the first $k_i$ nodes with less running processes than the others, the first $k_i$ nodes with more memory than the others, and $k_i$ nodes random selected from n nodes. The criterion of selecting $k_i$ nodes from n is related to the specific application or system.

Note that the set $K_i$ of a process may be very different from the other sets of another process since the processes collaborating together may also be very different. Moreover, the $k_i$ for each process can be different from the others, for example, the $k_i$ is hoped to be smaller for shorter process to save energy in datacenter. Thus, $k_i$ is not identical to each other generally. Thus, the total number of checkpoint data is represented by the blow equation Math. 1, and the total number of pre-selected nodes is represented by the blow equation Math. 2.

[Math. 1]

$$N_{ckpt} = \sum_{i=1}^{m} k_i \qquad \text{Math. 1}$$

[Math. 2]

$$N_{select} = \left| \bigcap K_i \right| \qquad \text{Math. 2}$$

To select the remote nodes and to allocate the $N_{ckpt}$ data over the n nodes are a technical problem in a specific system. In this specification, only the case is shown that $k_i$ is set to be k identically; the checkpoint data can be allocated to any node; and the number of checkpoint data in any one node cannot be greater than sup $[(k+1)*m/n]$. Similarly, if the $k_i$ is different, in a node the number of checkpoint data from different processes is no more than sup $[(N_{ckpt}+m)/N_{select}]$ as a general definition. Meanwhile, the original processes are also looked as checkpoint data so that here it is (k+1).

(Recovery)

The recovery is also twofold. When one of the remotely stored checkpoint data is suitable to recover the failure process, i.e., "hit", this is the fastest recovery because it needs only to run the new process rebuilt from the checkpoint data in memory. When no checkpoint data is suitable to recover the failure process, the things get a little more complex than the above. That is the recovery for "miss" is a little more complex than that for "hit". First, because there are k checkpoint data, (the original process is unavailable because of the failure), each remote node transfer 1/k checkpoint data to a newly selected node. The new node can be selected by some standards such as the node must be empty, the node must be the lightest loaded and so on. Thus, the data transmission time $t_N$ becomes to the value as indicated by the below expression Math. 3.

[Math. 3]

$$\phi'^{*}t_N \qquad \text{Math. 3}$$

where $0<\phi'<1$

It is easy to note that the expected recovery time $t_R$ is represented, by the below equation Math. 4.

[Math. 4]

$$t_R = (1-P_h)*\phi'^{*}t_N \qquad \text{Math. 4}$$

If phi coefficient is assumed to be the value represented by phi'(dash) as indicated by the below equation Math. 5, we have the expected recovery time $t_R$ as indicated by the below expression Math. 6.

[Math. 5]

$$\phi = (1-P_h) * \phi'$$ Math. 5

[Math. 6]

$$t_R = \phi * t_N$$ Math. 6 where $0 < \phi << 1$

Therefore, in this invention, the expected recovery time $t_R$ can be reduced to be the value as indicated by the above expression Math. 6 in comparison with that of the technique described in the above mentioned Non-Patent Literatures.

The main difference is that the checkpoint data is stored in the memories of multiple remote nodes pre-selected. To be simple, this invention gambles the future recovery node on these pre-selected. nodes. If one of the remote nodes pre-selected is suitable for recovery, this is the fastest way to recover the failure process.

Each checkpoint data can be divided arbitrarily into k partitions. Certainly, the partitions may be sized equally or unequally, for example, equally sized for uniform connection bandwidth. The newly selected node will merge all k partitions into a complete checkpoint data for the failure process. Then, the failure process is recovered.

Basically, the recovery time is the fastest if at least one node hits, and the recovery time is much less than the time used by other techniques if all nodes miss. In a system with abundant resources, the hit probability is very high. In a system with few abundant resources, phi coefficient is equal to phi'(dash) coefficient in the worst case.

This invention gambles the future, but the invention cannot always win a lot. In the worst cases, the speed-up of recovery is not so attractive considering the network transmission cost, and this is the weakness limiting the application of this invention. Because the checkpoint data should be multicast to the remote nodes, the network transmission cost is obviously high. In this invention, the incremental and probabilistic checkpointing are used to reduce the amount of checkpoint data in every checkpointing so that the transferred data is reduced. Although the transferred data can be reduced, the other techniques, disk-based and diskless checkpointing, can also employ incremental or probabilistic checkpointing so that the network transmission cost is relatively higher.

The absolute amount of transferred data can be estimated in a specific system, and the designer of the system can decide whether this invention can be used or not according to the network capacity. Because the incremental and probabilistic checkpointing can effectively reduce the checkpoint data, this invention is still suitable for most systems. Finally, how much this invention takes the advantage over the other techniques depends on the hit probability $P_h$, which is various in different systems, but even in the worst case, this invention is faster.

This invention can be integrated into distributed or centralized fault tolerant resource management. Here, only an abstract system is shown, wherein the resource management data database 202, the node control unit 204, and the failure detection unit of the management apparatus 200 denote an existing method detecting where a failure happens, such as heart beat, the simplest one. For simplicity, the following shows a centralized system, wherein the management apparatus 200 may take the global control including selecting nodes, responding to the failure detection, deciding where to recover failure processes and mark each partition of checkpoint data with a sequence number for merging in newly selected node.

The distributed system 1 of the present exemplary embodiment executes various processing operations in accordance with the computer program mounted as described above, and whereby various units such as described above are realized as various functions.

The computer program according to the present exemplary embodiment is a program for allowing a computer to realize a management apparatus 200, wherein the program is described so as to allow the computer to execute the procedures of: selecting spare nodes for future failure recovery for the each process before the failure occurs in the each process; instructing the nodes to previously allocate the checkpoint data to the selected spare nodes and to be transmitted to the selected spare nodes from each node which runs the each process to make the selected spare nodes store the transmitted checkpoint data in its memory before the failure occurs in the each process; judging whether at least one checkpoint data is suitable for recovering the detected failure process on the spare nodes when the failure occurs in the processes; selecting one checkpoint data for recovery the failure process when the judgment is made that at least one checkpoint data is suitable for recovery, to have at least one of the spare node activate the selected checkpoint data to run a process, so that the failure process can be recovered; instructing each of the spare nodes for the failure process to partition the existing checkpoint data in its memory into partitions, so as to integrate the partitions of the checkpoint data of respective spare nodes as a whole into complete checkpoint data for the failure process; instructing respective spare nodes for the failure process to transmit the partitions of checkpoint data respectively to a new node newly selected for recovery through the network when the judgment is made that any one checkpoint data is not suitable for recovery; and instructing the new node to reorganize the transmitted partitions of the checkpoint data into the complete checkpoint data for the failure process to be activated to run a process, so that the failure process can be recovered.

Figure 4:
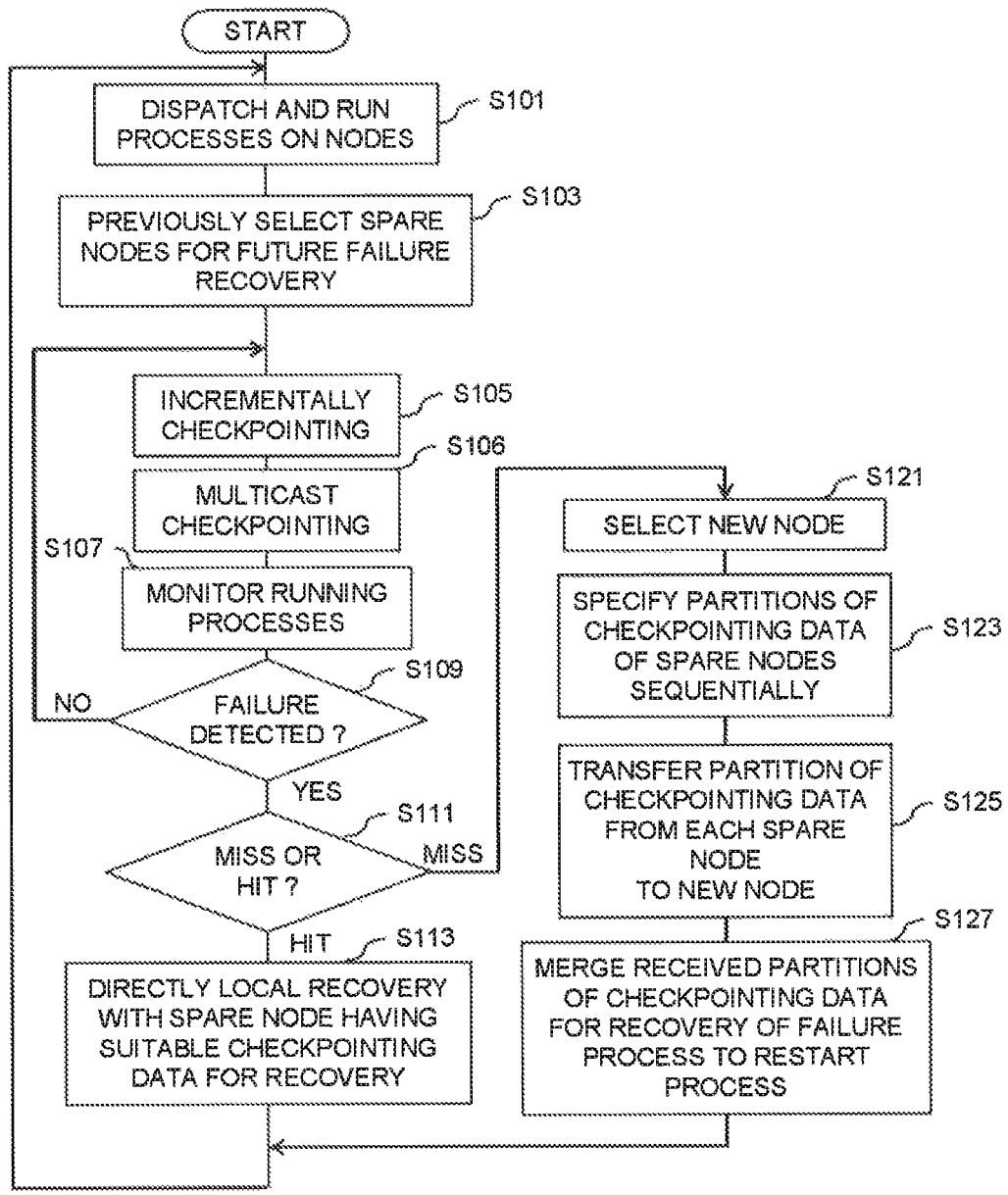
FIG. 4 is a flowchart showing an operation of the distributed system according to an exemplary embodiment of the present invention.

Hereafter, a method for failure discovery in the distributed system 1 of the present exemplary embodiment constructed as shown above will be described. FIG. 4 is a flowchart showing an example of an operation of the distributed system 1 of the present exemplary embodiment.

The method of the present exemplary embodiment is a method for failure recovery in a system including a plurality of nodes connected with each other through a network, each having a memory, and the nodes running distributed processes, including: (step S105) performing checkpointing on the processes to create checkpoint data for each process to be stored in the memory of the each node; selecting spare nodes for future failure recovery for the each process; (step S103) previously allocating the checkpoint data to the selected spare nodes and to be transmitted to the selected spare nodes from the each node which runs the each process to make the selected spare nodes store the transmitted checkpoint data in the memories, respectively; (step S111) judging whether at least one checkpoint data is suitable for recovering the detected failure process stored in the memories of the spare nodes when the failure occurs processes ("YES" in step S109); selecting one checkpoint data for recovering the failure process when the judgment is made that at least one checkpoint data is suitable for recovery ("HIT" in the step S111), to activate the selected checkpoint data to run a process on at least one of the spare nodes, so that the failure process can be recovered; (step S123) partitioning the existing checkpoint data stored in the memory of each spare node for the failure process into partitions, when the judgment is made that any one checkpoint data is not suitable for recovery ("MISS" in the step S111), the partitions of the checkpoint data of respective spare nodes as a whole being integrated into complete checkpoint data for the failure process; and (step S125) transmitting the partitions of checkpoint data respectively from the spare nodes for the failure process to a new node newly selected for recovery through the network, and (step S127) to reorganize the transmitted partitions of the checkpoint data into the complete checkpoint data for the failure process to be activated to run a process on the new node, so that the failure process can be recovered.

Figure 5:
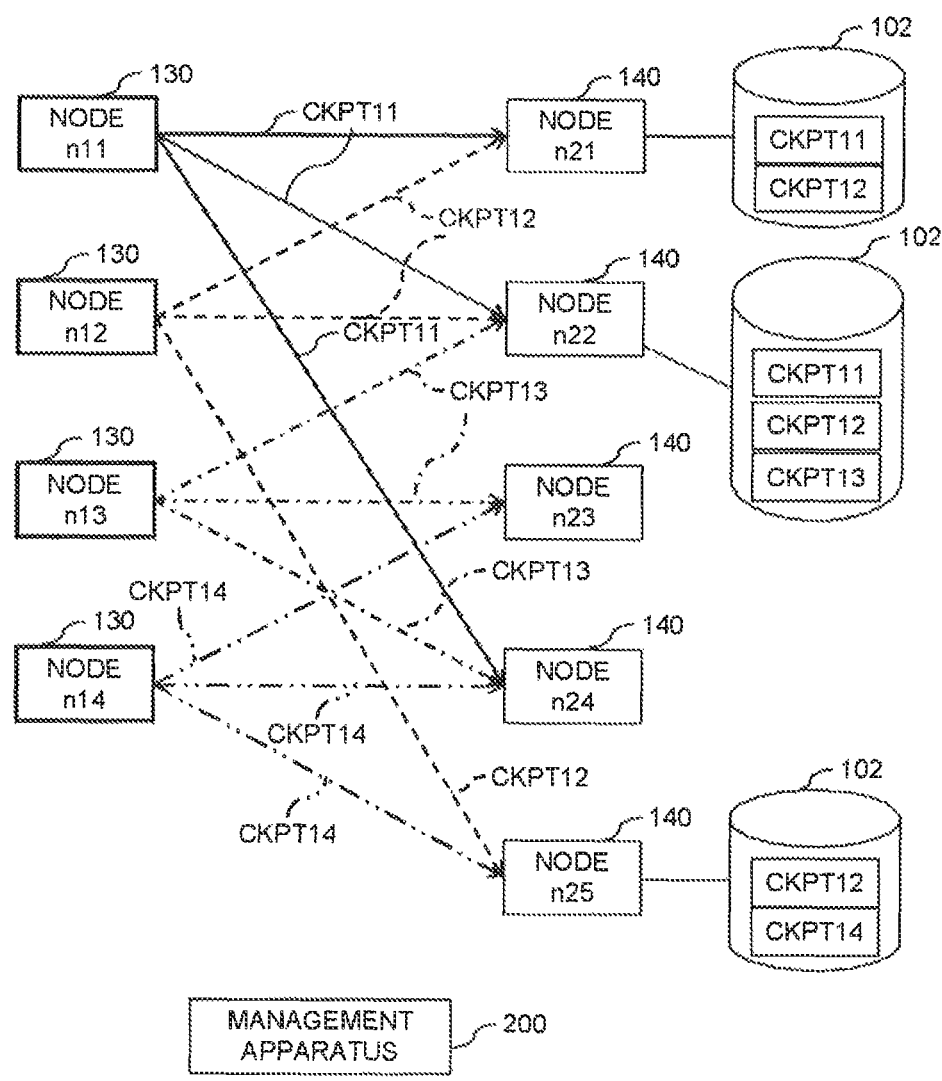
FIG. 5 is a diagram for an explanation of an operation of the distributed system according to an exemplary embodiment of the present invention.

More specifically, in the distributed system, the management apparatus 200 dispatches the processes on the nodes 130 shown in FIG. 5, such as the first nodes n11, n12, n13, and n14. In response to the instructions from the management apparatus 200, the nodes 130 run the processes (step S101).

The node selection unit 206 of the management apparatus 200 selects the spare nodes 140 (n21, n22, n23, n24, and n25), for future failure recovery for each process before the failure occurs in each process (step S103). For example, as shown in FIG. 5, the nodes 140 (n21, n22, and n24) are selected as the spare nodes for the recovery of the process performed by the node 130 (n11). The nodes 140 (n21, n22, and n25) are selected as the spare nodes for the recovery of the process preformed by the node 130 (n12). The nodes 140 (n22, n23, and n24) are selected as the spare nodes for the recovery of the process performed by the node 130 (n13). The nodes 140 (n23, n24, and n25) are selected as the spare nodes for the recovery of the process performed by the node 130 (n14).

Returning to the flowchart in FIG. 4, in the nodes 130, the checkpointing unit 108 performs incrementally checkpointing to create checkpoint data to be stored in the memory 102 (step S105). In the nodes 130, the multicasting unit 110 multicasts the created checkpoint data for the running process to the spare nodes 140 (step S106). Then the spare nodes 140 receive the checkpoint data and store the received checkpoint data in the memories 102, respectively. For example, as shown in FIG. 5, the checkpoint data "CKPT11" for the process executed by the node 130 (n11) are transmitted to the spare nodes 140 (n21, n22, and n24) through the network 3. , The checkpoint data "CKPT 12" for the process executed by the node 130 (n 12) are transmitted to the spare nodes 140 (n21, n22, and n25) through the network 3. The checkpoint data "CKPT13" for the process executed by the node 130 (n13) are transmitted to the spare nodes 140 (n22, n23, and n24) through the network 3. The checkpoint data "CKPT14" for the process executed by the node 130 (n14) are transmitted to the spare nodes 140 (n23, n24, and n25) through the network 3.

The checkpoint data "CKPT12" are received by the spare nodes 140 (n21, n22, and n25), and then stored in the memories 102 of the spares nodes 140 (n21, n22, and n25).

Returning back to the flowchart in FIG. 4, the failure detection unit 210 of the management apparatus 200 monitors the running processes executed by the nodes 130 (step S 107). When the failure of the process is detected by the failure detection unit 210 of the management apparatus 200 ("YES" in step S 109), the judgment unit 230 of the management apparatus 200 judges whether at least one checkpoint data is suitable for recovering the detected failure process on the spare nodes 140 (step S111). Here, the failure occurs in the process executed by the node 130 (n12).

Figure 6:
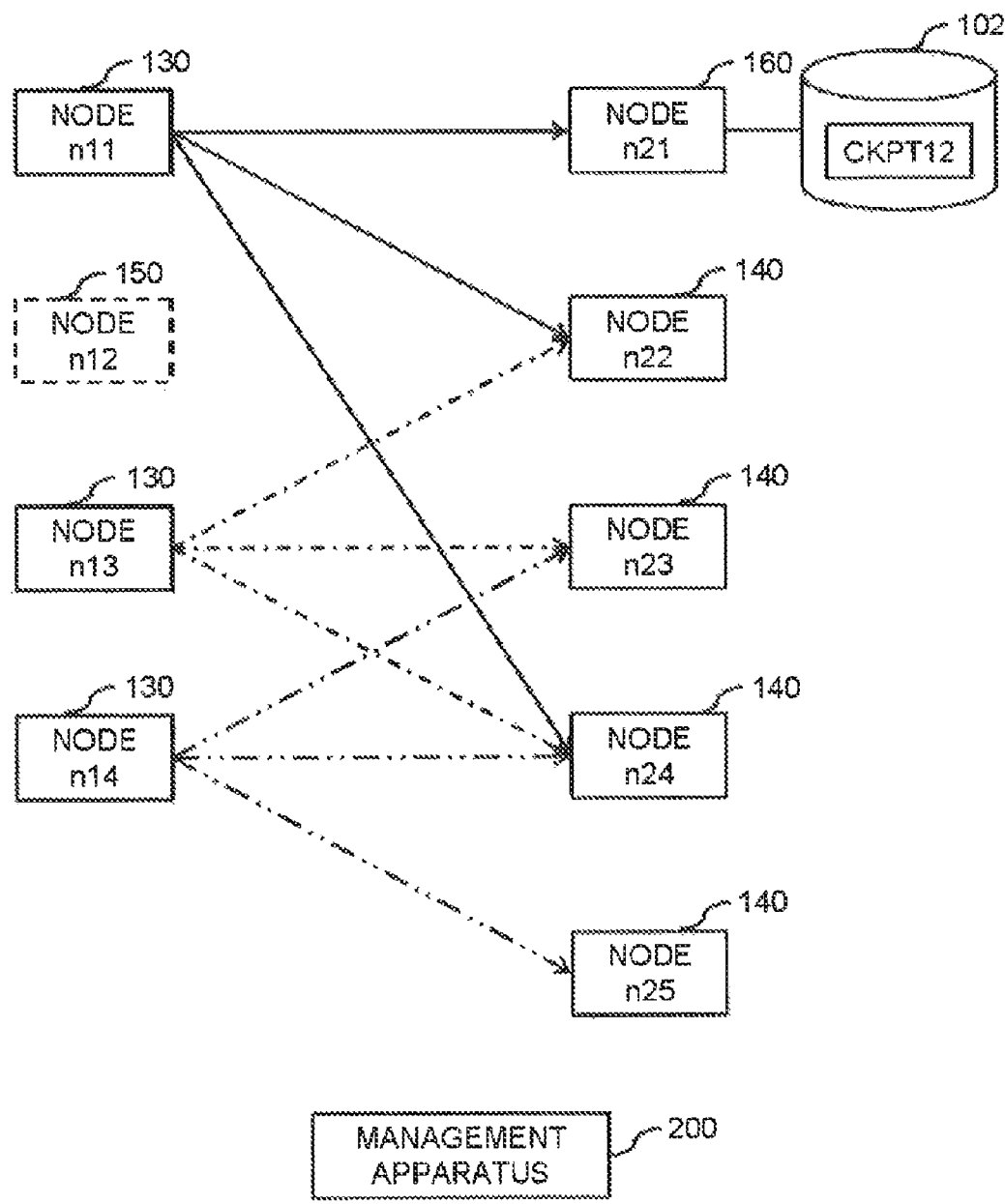
FIG. 6 is a diagram for an explanation of an operation of the distributed system according to an exemplary embodiment of the present invention.

When the judgment unit 230 of the management apparatus 200 judges that at least one checkpoint data is suitable for recovery ("HIT" in step S111), the checkpoint selection unit 232 of the management apparatus 200 selects one from the spare nodes 140 (n21, n22, and n25) which store the checkpoint data "CKPT12" in the memory 102. In this case, the spare node n21 is selected by the checkpoint selection unit 232 of the management apparatus 200. The recovery unit 212 of the management apparatus 200 instructs the node 160 (n21) to recover the process through the network 3, as shown in FIG. 6.

In accordance with the instruction of the management apparatus 200, the control unit 112 of the node 160 (n21) activates the checkpoint data stored in the memory 102 to have the processing unit 104 run a process, so that a failure process can be recovered (step S113). Therefore the directly recovery with the spare node 140 having a suitable checkpoint data for recovery can be performed.

Figure 7:
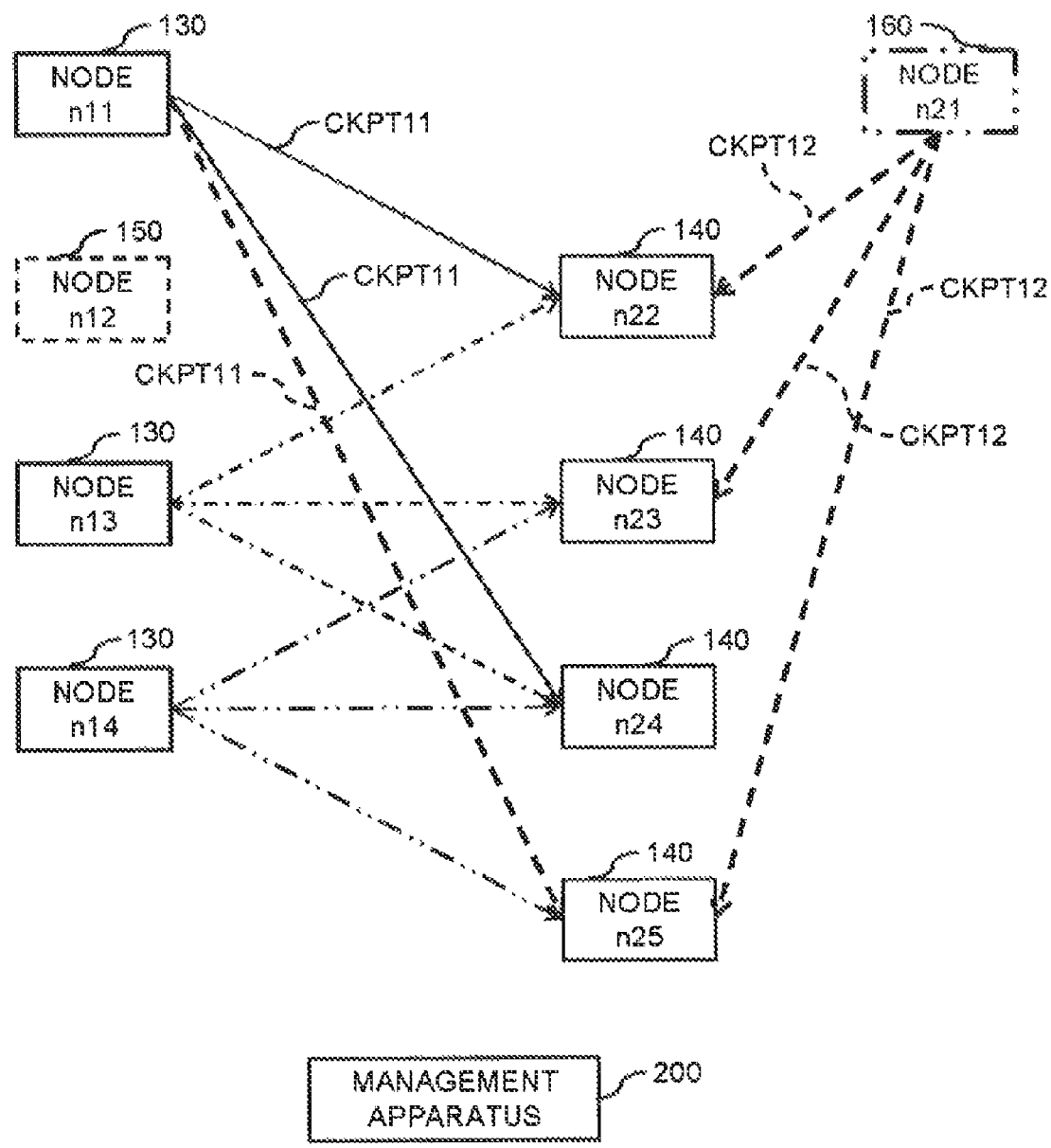
FIG. 7 is a diagram for an explanation of an operation of the distributed system according to an exemplary embodiment of the present invention.

The step in this flowchart returns back to the step S103, the node selection unit 206 of the management apparatus 200 selects again the spare nodes 140 (n22, n24, and n25) for the process executed by the node 160 (n21) which newly stars the process instead of the failure node 150 (n12), as shown in FIG. 7. Accordingly, the node 140 (n25) is additionally selected by the node selection unit 206 instead of the node 160 (n21).

Figure 8:
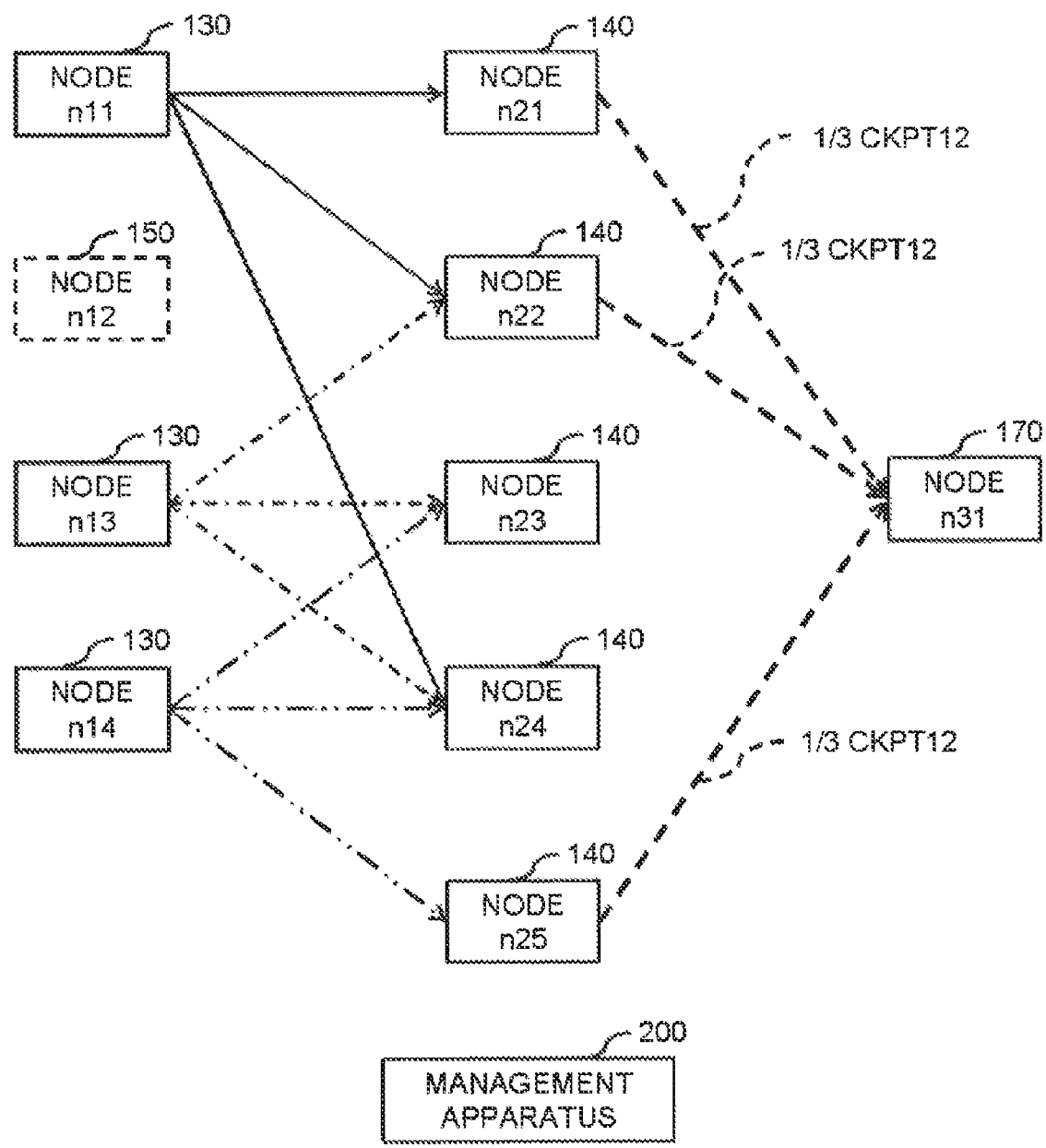
FIG. 8 is a diagram for an explanation of an operation of the distributed system according to an exemplary embodiment of the present invention.

When the judgment unit 230 of the management apparatus 200 judges that any one checkpoint data is not suitable for recovering the failure ("MISS" in step S111), new node selection unit 240 of the management apparatus 200 selects a new node for recovery from among the distributed system 1. Here, the node 170 (n31) as shown in FIG. 8 is selected as a new node for recovery by the new node selection unit 240 of the management apparatus 200 (step S121).

Then, the partition specification unit 242 of the management apparatus 200 instructs the nodes 140 (n21, n22, and n25) to partition the existing checkpoint data stored in memory 102 for the failure process into several partitions, here, 3 partitions. Further the partition specification unit 242 of the management apparatus 200 instructs the spare nodes 140 (n21, n22, and n25) to specify respective partitions of the checkpoint data of the spare nodes (n21, n22, and n25), sequentially so as to integrate the partitions of the checkpoint data of the spare nodes (n21, n22, and n25) into complete checkpoint data for the failure process (step S123).

In accordance with the instruction of the management apparatus 200, the control unit 112 of each of the spare nodes 140 (n21, n22, and n25) partitions the existing checkpoint data stored in the memory 102 into 3 partitions. In accordance with the further instruction from the management apparatus 200, the control unit 112 of each of the nodes 140 (n21, n22, and n25) transmits one of ⅓ partition of checkpoint data to the new node 170 (n31) through the network 3 (step S125).

The new node 170 (n31) receives three of ⅓ partitions of checkpoint data from respective spare nodes 140 (n21, n22, and n25) through the network 3. As described above, three of ⅓ partitions of the checking data as a whole can be integrated into complete checkpoint data for the failure process. The control unit 112 of the new node 170 (n31) reorganizes the received partitions of the checkpoint data into the complete checkpoint data for the failure process. The control unit 112 activates the checkpoint data to have the processing unit 104 to restart a process from the checkpoint in accordance with the control of the management apparatus 200, so that said failure process can be recovered (step S127).

Figure 9:
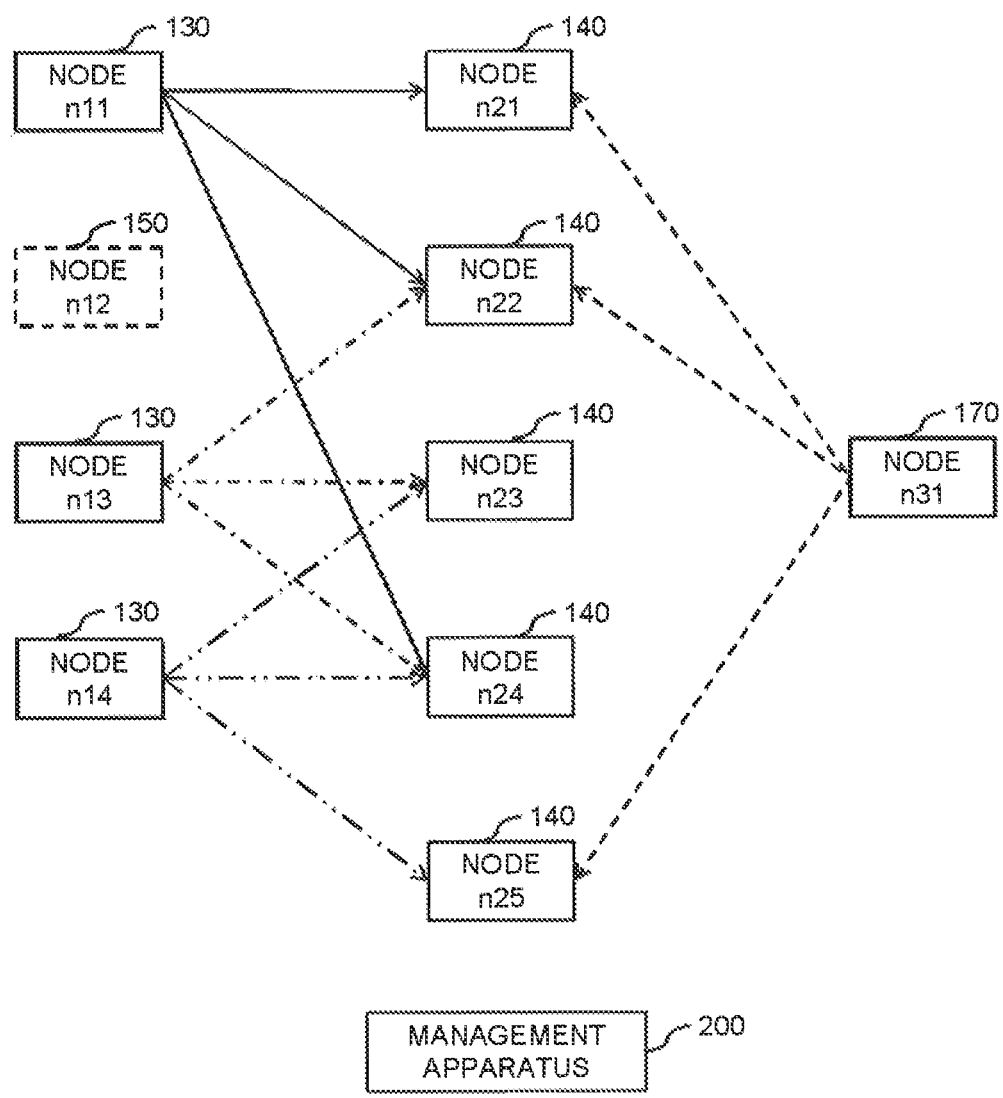
FIG. 9 is a diagram for an explanation of an operation of the distributed system according to an exemplary embodiment of the present invention.

Accordingly, the node 170 (n31) can perform the process instead of the failure node 130 (n12) as shown in FIG. 9. The step of this flowchart returns to the step 103.

As shown above, the exemplary embodiments of the present invention have been described. However, these are exemplifications of the present invention, so that one can adopt various constructions other than those described above.

In the above exemplary embodiment of the system, a plurality of processes are executed by a plurality of nodes, respectively. Namely, a single process is executed by only a single node. However, a single process may be executed by a plurality of nodes. In this case, the similar manner to that of the above exemplary embodiment may be also performed.

In another exemplary embodiment, the reorganization unit 244 may add a new pre-allocated node, or move the data in the pre-allocated nodes to the new pre-allocated node, so as to guarantee a first the number of checkpoint data of each process and a second the number of checkpoint data in each pre-allocated node meet the definition at the very beginning of the system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-000268, filed on Jan. 4, 2010, the disclosure of which is incorporated herein in its entirety by reference.

The invention claimed is:

1. A method for failure recovery in a system including a plurality of nodes connected with each other through a network, each of said nodes having a memory, and said nodes respectively running processes, comprising:

performing checkpointing on said processes to create checkpoint data for each process to be stored in said memory of said each node;

selecting a plurality of spare nodes for future failure recovery for said each process before the failure occurs in any of said processes;

previously allocating said checkpoint data to the selected spare nodes, before the failure occurs in any of said processes to transmit the allocated checkpoint data to said selected spare nodes from said each node which runs said each process, and to make said selected spare nodes store the transmitted checkpoint data in said memories, respectively;

detecting a failure process in which failure has occurred;

judging whether at least one checkpoint data suitable for recovering the detected failure process is stored in said memories of said spare nodes when the failure occurs in said processes;

selecting one checkpoint data for recovering said failure process when the judgment is made that at least one checkpoint data is suitable for recovery, to activate the selected checkpoint data to run a process on at least one of said spare nodes, so that said failure process can be recovered;

partitioning the existing checkpoint data stored in said memory of each spare node for said failure process into partitions, when the judgment is made that any one checkpoint data is not suitable for recovery, said partitions of said checkpoint data of respective spare nodes as a whole composing complete checkpoint data for said failure process; and transmitting a different one of said partitions of checkpoint data respectively from said spare nodes for said failure process to a further node newly selected for recovery through said network, and to reorganize the transmitted partitions of said checkpoint data into said complete checkpoint data for said failure process to be activated to run a process on said further node, so that said failure process can be recovered.

2. The method for failure recovery as set forth in claim 1, wherein in said selecting said spare nodes, said spare nodes for future failure recovery are selected in a manner selected from manners including a first manner in that a node is selected the higher priority with less running processes than those of the remaining nodes, a second manner in that a node is selected the higher priority with more memory capacity than those of the remaining nodes, a third manner in that a node is selected in random order, and a combination of those.

3. The method for failure recovery as set forth in claim 1, further comprising:

selecting k spare nodes for said each process before the failure occurs in said each process;

multicasting said checkpoint data to the selected k spare nodes through said network;

storing said checkpoint data in said memory of each of said k spare nodes; and when the judgment is made that any one checkpoint data is not suitable for recovery in response to the detection of said failure process, partitioning said checkpoint data in each of said k spare nodes for said failure process into 1/k partitions, 1/k partitions of checkpoint data of respective k spare nodes as a whole being integrated into complete checkpoint data for said failure process, to transmit said 1/k partitions of said checkpoint data respectively from said k spare nodes to said new node through said network.

4. The method for failure recovery as set forth in claim 3, wherein for each process, in the case where said k is different from that of the other process, a threshold of the number of said storing checkpoint data in said memory of said spare nodes being $\sup[(N_{ckpt}+m)/N_{select}]$, here $N_{ckpt}$ being a total number of checkpoint data for each process, said m being the number of said running processes on said n nodes, and said $N_{select}$ being a total number of said spare nodes.

5. The method for failure recovery as set forth in claim 3, wherein in the case of identical k for each process, the number of checkpoint data from different processes is no more than $\sup[(k+1)*m/n]$.

6. The method for failure recovery as set forth in claim 3, further comprising:

transferring the partitioned 1/k checkpoint data from each of said spare nodes to said new node, and said partitioned 1/k data being different from the others;

reorganizing the transferred checkpoint data in said new node so as to recover said failure process;

preparing memory context for said failure process; and then activating the recovered process.

7. The method for failure recovery as set forth in claim 1, further comprising:

finding a proper recovery point from said checkpoint data when the judgment is made that at least one checkpoint data is suitable for recovery;

then preparing the memory context for said failure process; and finally activating the process to be recovered in said spare node which is suitable to run newly recovered process by restarting from said recovery point.

8. The method for failure recovery as set forth in claim 1, wherein said checkpointing includes an incremental or probabilistic checkpointing or a combination thereof.

9. The method for failure recovery as set forth in claim 1, wherein said reorganizing said partitions includes adding a new pre-allocated node, or moving the data in the pre-allocated nodes to said new pre-allocated node, so as to guarantee a first the number of checkpoint data of each process and a second the number of checkpoint data in each pre-allocated node meet the definition at the very beginning of the system.

10. A distributed system comprising:
   a plurality of nodes connected with each other through a network, each of said nodes having a memory, and said nodes respectively running processes;
   a checkpointing unit which performs checkpointing on said processes to create checkpoint data for each process to be stored in said memory of said each node;
   a node selection unit which selects a plurality of spare nodes for future failure recovery for said each process before a failure occurs in any of said processes;
   an allocation unit which allocates said checkpoint data to the selected spare nodes, before the failure occurs in any of said processes to transmit the allocated checkpoint data to said selected spare nodes from said each node which runs said each process, and to make said selected spare nodes store the transmitted checkpoint data in said memories, respectively;
   detection unit which detects a failure process in which failure has occurred;
   a judgment unit which judges whether at least one checkpoint data suitable for recovering said failure process stored in said memories of said spare nodes when the failure occurs in said processes;
   a checkpoint selection unit which selects one checkpoint data for recovering said failure process when the judgment is made that at least one checkpoint data is suitable for recovery, to activate the selected checkpoint data to run a process on at least one of said spare nodes, so that said failure process can be recovered;
   a checkpoint partition unit which partitions the existing checkpoint data stored in said memory of each spare node for said failure process into partitions, when the judgment is made that any one checkpoint data is not suitable for recovery, said partitions of said checkpoint data of respective spare nodes as a whole composing complete checkpoint data for said failure process; and
   a reorganization unit which transmits a different one of said partitions of checkpoint data respectively from said spare nodes for said failure process to a further node newly selected for recovery through said network, and to reorganize the transmitted partitions of said checkpoint data into said complete checkpoint data for said failure process to be activated to run a process on said further node, so that said failure process can be recovered.

11. A management apparatus for failure recovery in a distributed system, said distributed system including a plurality of nodes connected with each other through a network, each of said node having a memory, and said nodes respectively running process and performing checkpointing on said processes to create checkpoint data for each process, comprising:
   a node selection unit which selects a plurality of spare nodes for future failure recovery for said each process before a failure occurs in any of said processes;
   a pre-allocation unit which previously allocates said checkpoint data to the selected spare nodes, before the failure occurs in any of said processes to transmit the allocated checkpoint data to said selected spare nodes from each node which runs said each process, and to make said selected spare nodes store the transmitted checkpoint data in its memory;
   a detection unit which detects a failure process in which failure has occurred;
   a judgment unit which judges whether at least one checkpoint data is suitable for recovering the detected failure process on said spare nodes when the failure process is detected;
   a checkpoint selection unit which selects one checkpoint data for recovery said failure process when the judgment is made that at least one checkpoint data is suitable for recovery, to have at least one of said spare node activate the selected checkpoint data to run a process, so that said failure process can be recovered;
   a recovery unit which has each of said spare nodes for said failure process partition the existing checkpoint data in its memory into partitions, so as to integrate said partitions of said checkpoint data of respective spare nodes as a whole into complete checkpoint data for said failure process; and
   a reorganization unit which has respective spare nodes for said failure process transmit a different one of said partitions of checkpoint data respectively to a further node newly selected for recovery through said network when the judgment is made that any one checkpoint data is not suitable for recovery, and to have said further node reorganize the transmitted partitions of said checkpoint data into said complete checkpoint data for said failure process to be activated to run a process, so that said failure process can be recovered.

12. A non-transitory computer-readable medium storing thereon a computer program to control a management apparatus, a plurality of said nodes in a distributed system connected with each other through a network, each of said nodes having a memory, and said nodes respectively running process and performing checkpointing on said processes to create checkpoint data for each process, wherein said computer program executes the procedures of:
   selecting a plurality of spare nodes for future failure recovery for said each process before the failure occurs in any of said processes;
   instructing the nodes to previously allocate said checkpoint data to the selected spare nodes, before the failure occurs in any of said processes to transmit the allocated checkpoint data to said selected spare nodes from each node which runs said each process, and to make said selected spare nodes store the transmitted checkpoint data in its memory;
   detecting a failure process in which failure has occurred;
   judging whether at least one checkpoint data is suitable for recovering the detected failure process on said spare nodes when the failure occurs in said processes;
   selecting one checkpoint data for recovery said failure process when the judgment is made that at least one checkpoint data is suitable for recovery, to have at least one of said spare node activate the selected checkpoint data to run a process, so that said failure process can be recovered;
   instructing each of said spare nodes for said failure process to partition the existing checkpoint data in its memory into partitions, so as to integrate said partitions of said checkpoint data of respective spare nodes as a whole into complete checkpoint data for said failure process;
   instructing respective spare nodes for said failure process to transmit a different one of said partitions of checkpoint data respectively to a further node newly selected for recovery through said network when the judgment is made that any one checkpoint data is not suitable for recovery; and
   instructing said further node to reorganize the transmitted partitions of said checkpoint data into said complete checkpoint data for said failure process to be activated to run a process, so that said failure process can be recovered.

13. A node in a distributed system, a plurality of said nodes being connected with each other through a network, and connected to a management apparatus for controlling said nodes through said network, the node comprising:
- a processing unit which executes processes to run in accordance with the control of said management apparatus;
- a checkpointing unit which performs checkpointing on said processes to create checkpoint data for each of said processes;
- a memory which stores said checkpoint data; and
- a multicasting unit which multicasts said checking data to spare nodes for future failure recovery of said running process specified from said management apparatus and to have said specified spare nodes store the received checkpoint data in said memories, respectively, wherein said spare nodes each comprise:
- a receiving unit which receives checkpointing data transmitted from other nodes which run said processes through said network;
- a memory which stores the received checkpoint data;
- a processing unit which executes said processes to run in accordance with the control of said management apparatus;
- an activate unit which, in accordance with the control of said management apparatus, when a process is a failure, and said management apparatus judges that said checkpoint data stored in said memory is suitable for recovering said failure, activates said checkpoint data stored in said memory such that said processing unit runs a process, so that a failure process can be recovered;
- a checkpoint partition unit which partitions the existing checkpoint data, stored in said memory for the failure process, into partitions such that, in accordance with the control of said management apparatus, when the process is a failure, and said management apparatus judges that any one checkpoint data is not suitable for recovering said failure, said partitions of said checkpoint data of respective spare nodes are composed into a complete checkpoint data for said failure process; and
- a transmitting unit which transmits one of said partitions of said checkpoint data to a further node newly selected for recovery through said network in accordance with the control of said management apparatus.

14. A node in a distributed system, a plurality of said nodes being connected with each other through a network, connected to a management apparatus for controlling said nodes through said network, and serving as a spare for running nodes, comprising:
- a receiving unit which receives checkpointing data transmitted from other nodes which run said processes through said network;
- a memory which stores the received checkpoint data;
- a processing unit which executes processes to run in accordance with the control of said management apparatus;
- an activate unit which in accordance with the control of said management apparatus when a process occurs a failure and said management apparatus judges that said checkpoint data stored in said memory is suitable for recovering said failure, activates said checkpoint data stored in said memory to have said processing unit run a process, so that a failure process can be recovered;
- a checkpoint partition unit which partitions the existing checkpoint data stored in said memory for a failure process into partitions, in accordance with the control of said management apparatus when a process occurs a failure and said management apparatus judges that any one checkpoint data is not suitable for recovering said failure, said partitions of said checkpoint data of respective spare nodes as a whole composing complete checkpoint data for said failure process; and
- a transmitting unit which transmits one of said partitions of checkpoint data to a further node newly selected for recovery through said network in accordance with the control of said management apparatus.

15. A node in a distributed system, a plurality of said nodes being connected with each other through a network, and connected to a management apparatus for controlling said nodes through said network, comprising:
- a processing unit which executes processes to run in accordance with the control of said management apparatus;
- a receiving unit which receives different partitions of checkpoint data from respective spare nodes which are previously prepared for future failure recovery and reserve the checkpointing data for recovering processes such that, when a process is a failure, and said management apparatus judges that any one checkpoint data is not suitable for recovering said failure, said partitions of said checking data as a whole are composed into a complete checkpoint data for failure process; and
- a reorganization unit which reorganizes the received partitions of said checkpoint data into said complete checkpoint data for said failure process to be activated so that said processing unit runs a process in accordance with the control of said management apparatus when the process is a failure, so that said failure process can be recovered, said spare nodes comprising:
- a receiving unit which receives checkpointing data transmitted from other nodes, which run said processes through said network;
- a memory which stores the received checkpoint data;
- a processing unit which executes said processes to run in accordance with the control of said management apparatus;
- an activate unit which, in accordance with the control of said management apparatus, when a process is a failure, and said management apparatus judges that said checkpoint data stored in said memory is suitable for recovering said failure, activates said checkpoint data stored in said memory such that said processing unit runs a process in said processes, so that a failure process can be recovered;
- a checkpoint partition unit which partitions the existing checkpoint data, stored in said memory for the failure process, into partitions such that, in accordance with the control of said management apparatus, when the process is a failure, and said management apparatus judges that any one checkpoint data is not suitable for recovering said failure, said partitions of said checkpoint data of respective spare nodes are composed into a complete checkpoint data for said failure process; and
- a transmitting unit which transmits one of said partitions of said checkpoint data to a further node newly selected for recovery through said network in accordance with the control of said management apparatus.

* * * * *

UNITED STATES PATENT AND TRADEMARK OFFICE
CERTIFICATE OF CORRECTION

PATENT NO. : 8,880,931 B2  
APPLICATION NO. : 13/520514  
DATED : November 4, 2014  
INVENTOR(S) : Wei Sun It is certified that error appears in the above-identified patent and that said Letters Patent is hereby corrected as shown below:

In the Specification

Column 1, line 62: Delete "NFL" and insert -- NPL --

Column 3, Line 1: Delete "computatfon" and insert -- computation --

Column 3, Line 43: Delete "283-297." and insert -- 288-297. --

Column 9, Line 23: Delete "nll" and insert -- n11 --

Column 9, Line 47: Delete "162" and insert -- 102 --

Signed and Sealed this  
Twenty-first Day of July, 2015

Michelle K. Lee  
*Director of the United States Patent and Trademark Office*